(12) United States Patent
Kitahara et al.

(10) Patent No.: US 6,503,988 B1
(45) Date of Patent: *Jan. 7, 2003

(54) POLYTETRAFLUOROETHYLENE FINE POWDERS AND THEIR USE

(75) Inventors: Takahiro Kitahara; Kazutaka Hosokawa; Tetsuo Shimizu, all of Settsu (JP)

(73) Assignee: Daikin Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,805

(22) PCT Filed: Nov. 8, 1996

(86) PCT No.: PCT/JP96/03299
§ 371 (c)(1),
(2), (4) Date: Apr. 23, 1998

(87) PCT Pub. No.: WO97/17382
PCT Pub. Date: May 15, 1997

(30) Foreign Application Priority Data

Nov. 9, 1995 (JP) ............................................. 7-317312
Aug. 19, 1996 (JP) ............................................. 8-237282

(51) Int. Cl.[7] ........................ C08F 114/18; C08F 14/18; C08F 214/18
(52) U.S. Cl. .................... 525/326.2; 524/546; 524/805; 526/250
(58) Field of Search ................................ 524/546, 805; 525/326.2; 526/250

(56) References Cited

U.S. PATENT DOCUMENTS

| 4,218,542 A | * | 8/1980 | Ukihashi et al. | ............... | 521/27 |
| 4,640,955 A | | 2/1987 | Malhotra | ................... | 524/546 |
| 4,645,786 A | * | 2/1987 | Perthuis et al. | ............. | 524/106 |
| 4,829,683 A | * | 5/1989 | Chikamori et al. | ............ | 36/51 |
| 4,840,998 A | * | 6/1989 | Shimizu et al. | ............. | 525/276 |
| 5,324,785 A | * | 6/1994 | Noda et al. | .................. | 525/276 |

OTHER PUBLICATIONS

English Abstract of JP-A-5-287,151-Ishikawa et al.

* cited by examiner

Primary Examiner—James J. Seidleck
Assistant Examiner—U. K. Rajguru
(74) Attorney, Agent, or Firm—Arent Fox Kintner Plotkin & Kahn, PLLC

(57) ABSTRACT

A polytetrafluoroethylene fine powder excellent in powder flowability which comprises fine particles (the primary particle) having a mean particle diameter of 0.05 to 1 μm, an apparent density of 0.52 to 0.70 g/ml, a standard specific gravity (SSG) of 2.14 to 2.23, and a secondary mean particle diameter of 100 to 1000 μm, antidripping agent using the above polytetrafluoroethylene fine powder, flame resistive resin composition containing this powder, and composition for inhibiting dust characteristics containing this powder.

15 Claims, 3 Drawing Sheets

POLYTETRAFLUOROETHYLENE FINE POWDERS AND THEIR USE

TECHNICAL FIELD

The present invention relates to polytetrafluoroethylene (hereinafter referred to as PTFE in some cases) fine powder having superior powder flowability. This PTFE fine powder is suitably used as a molding material for paste extrusion molding and the like, alternatively, as a resin additive for reforming the properties of a variety of resins.

BACKGROUND ART

Conventional PTFE fine powders have the properties of being apt to coagulate and thus exhibit poor working efficiency when they are taken out of containers for being used in molding or the like. Poor working efficiency can be seen, for example, when PTFE fine powders are mixed with an extrusion aid in the step of extruding rod or tube-shaped premolded articles by paste extrusion method. In addition, there are the following problems. In cases where PTFE fine powders are added to plastic for imparting sliding properties or antidripping properties, it is necessary to premix the PTFE fine powder with a material resin. At that time, however, the powders coagulate in a Henschel mixer or an extruder's feeder to cause blocking, which considerably degrades working efficiency and productivity. in addition, since PTFE fine powders have poor dispersibility to material resins, silver lines caused by the segregated PTFE may occur on the surfaces of molded articles, depending: on the conditions of compounds. The term "silver line" is a silvery bar trace that generates on the surfaces of molded articles in the flow direction of resins.

Detailed description is given of the cases where PTFE fine powder are used as an antidripping agent.

As to the flame resistance regulations for plastics, the standards of various countries have been integrated in recent years. In Japan the regulations have been severer because of the tendency of product security. As the safety standards of electronic and electrical equipment, the regulations of UL (Underwriters's Laboratories) in the USA have the outstanding contents, which is not the domestic standards in Japan, but have a significant influence. In these circumstances, the demand for flame resistive resins is expected to increase for the future.

Since much of thermoplastic resins used in electrical appliances and office machinery are flammable, flame retardants are usually added for improving the incombustibility of resin molded articles. To meet the requirements for miniaturization and thin-wall of molded articles, the regulations of UL 94 required for flame resistive resins have become severer in these years. In the latest notebook PCs, for example, the wall thickness does not exceed 1 mm so as to obtain 300-g frames for compactness and lightness. Conventional flame resistive resins can make molded articles non-flammable, however, if used for such thin articles, it is liable that once they begin to burn, thermoplastic resins are in the liquid state and drip while burning, and then spread. On the other hand, it is known to prevent dripping during burning by adding and kneading PTFE fine powder into thermoplastic resins. This utilizes the characteristics that PTFE fine powders are easily fibrilized.

As to flame retardants, bromine-containing flame retardant DBDE (decabromodiphenyl ether), has often used for high impact polystyrene (HIPS), ABS, polycarbonate (PC), polybutyleneterephthalate (PBT), etc. However, replacement of DBDE has proceeded rapidly because of dioxin that is considered to generate in burning DBDE. As a substitute, brominated epoxy oligomer is presently the most effective from the viewpoints of flame resistance and weather resistance. However, the bromine content of brominated epoxy oligomer is about two- thirds of that of DBDE, and thus it is required to increase the amount of addition. Furthermore, the price of brominated epoxy oligomer is about 1.5 times that of DBDE, thereby increasing the cost of flame resistive resins. Therefore, a reduction of flame retardant is a big subject. In this regard, it is known that flame retardant can be reduced if an antidripping function is imparted by the addition of PTFE fine powder. However, as described earlier, PTFE fine powders are generally apt to coagulate. Hence, the powders mixed with a material resin may solidify in a Henschel mixer or an extruder's feeder during premixing, to cause blocking, which may often significantly deteriorate handling characteristics and productivity. Also, due two poor dispersibility, silver lines caused by the segregated PTFE may occur on the surfaces of molded articles, depending on the conditions of compounds.

Meanwhile, it is well known that fibrillating polytetrafluoroethylene is incorporated into powder having dusting characteristics to prevent dusting characteristics (JP-B-32877/1977, JP-B-24872/1993, JP-A-91993/1989 and JP-A-81882/1989).

In industrial manufacturing, economy, productivity and working efficiency must be taken into consideration. In order to uniformly disperse polytetrafluoroethylene in a desired concentration, it is desirable that polytetrafluoroethylene is supplied individually by an automatic weight or volumetric counting feeder.

However, due to poor powder flowability of conventional polytetrafluoroethylene, the jamming of powders has occurred in automatic weight or volumetric counting feeders, so that working efficiency is significantly reduced.

Accordingly, it is an object of the present invention to provide PTFE fine powders excellent in powder flowability which are used as molding materials, resin additive, or the like.

It is another object of the present invention to provide antidripping agents, excellent in handling characteristics and dispersibility while maintaining antidripping property, as well as flame resistive resin compositions containing the antidripping agent.

It is still another object of the present invention to provide compositions for inhibiting dusting characteristics that are excellent in handling characteristics and working efficiency.

DISCLOSURE OF THE INVENTION

The present invention relates to a polytetrafluoroethylene fine powder excellent in powder flowability which comprises fine particles (the primary particle) having a mean particle diameter of 0.05 to 1 $\mu$m, an apparent density of 0.52 to 0.70 g/ml, a standard specific gravity (SSG) of 2.14 to 2.23, and a secondary mean particle diameter of 100 to 1000 $\mu$m. The invention also relates to antidripping agents using the above polytetrafluoroethylene fine powder, flame resistive resin compositions containing this powder, and compositions, for inhibiting dust characteristics containing this powder.

The polytetrafluoroethylene fine powder of the invention is characterized in having specific mean particle diameters of the primary and secondary particles, specific apparent density and standard specific gravity, as defined above.

PTFE fine powder of the invention can be prepared by a method in which a polymer latex is obtained by known emulsion polymerization (JP-B-4643/1962, JP-B-14466/1971, JP-B-26242/1981, and U.S. Pat. No. 2,965,595), and a surfactant is then added into the latex when subjected to a coagulation.

It is not fully why the apparent density of PTFE fine powder increases by the addition of surfactant in coagulating the latex after the reaction, however, it is estimated that the primary particles within the secondary particles are closely filled when water evaporates in the step of drying. As a result, powders in which particles are highly packed with a high apparent density are obtained, improving powder flowability.

The fibrillating properties of PTFE fine powder are the characteristics that can be normally recognized in the PTFE whose molecular weight is too high to perform melt molding (i.e., the melt viscosity at 380° C. is more than $10^8$ poise). Specifically, such PTFE have a standard specific gravity (ASTM D-1457) of not more than 2.23, preferably in the range of 2.14 to 2.23 (as the value of standard specific gravity decreases, the molecular weight increases). Over 2.23, i.e., in lower molecular weights, it is less susceptible to fibrillation. On the contrary, the PTFE having a high molecular weight whose standard specific gravity is smaller than 2.14 do not lose the fibrillating properties inherent in high molecular weight PTFEs. However, their manufacturing is difficult and thus not practical.

In the polytetrafluoroethylene fine powders of the invention, even if fine powder comprising fine particles of a modified PTFE is used, such a modified PTFE is included in the PTFE fine powder of the invention, without deteriorating fibrillating properties (JP-B-26242/1981, JP-B-3765/1992 and JP-A-1711/1989).

Here, the term "modification" means that other fluorine-containing monomer is copolymerized in a small amount when polymerizing tetrafluoroethylene. The modified amount is so adjusted that the copolymerized monomer content is about 0.001 to 2 wt %, preferably 0.01 to 1 wt %, more preferably 0.03 to 0.3 wt %, to the entire polymer fine particles to be generated.

As the fluorine-containing monomer for copolymerization used in modification, there are generally employed at least one of chlorotrifluoroethylene (CTFE) hexafluoropropene (HFP), perfluoro (alkyl vinyl ether) (PFAVE), and the like.

As surfactants used in the present invention, there are fluorine-containing surfactants, e.g., fluorine-containing anionic surfactants, fluorine-containing nonionic surfactants, fluorine-containing cationic surfactants, fluorine-containing betainic surfactants; and hydrocarbon-containing surfactants, e.g., hydrocarbon-containing nonionic surfactants, hydrocarbon-containing anionic surfactants.

Examples of fluorine-containing anionic surfactants include compounds of the formula (1). There are for example $CF_3(CF_2)_6COONH_4$, $CF_3(CF_2)_7COONa$, and $H(CF_2CF_2)_4COONH_4$ (1)

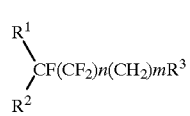

wherein $R^1$ is F or $CF_3$, $R^2$ is H, F or $CF_3$, n is an integer of 4 to 20, m is 0 or an integer of 1 to 6, $R^3$ is COOM or $SO_3M$, M is H, $NH_4$, Na, K or Li.

Examples of fluorine-containing nonionic surfactants include the compounds of the formula (2)

(2)

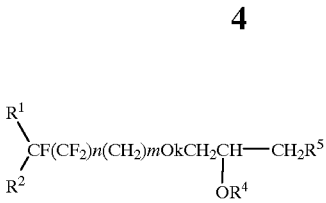

wherein $R^1$, $R^2$, n and m are as defined above, k is 0 or 1, $R^4$ is H, $CH_3$ or $OCOCH_3$, $R^5$ is $(OCH_2CH_2)$ $pOR^6$, p is 0 or an integer of 1 to 50, $R^6$ is H, $C_1$~$C_{20}$ alkyl or $C_6$~$C_{26}$ aromatic group.

Examples of fluorine-containing cationic surfactants include the compounds of the formula (2) wherein $R_5$ is a group of the formula (3).

(3)

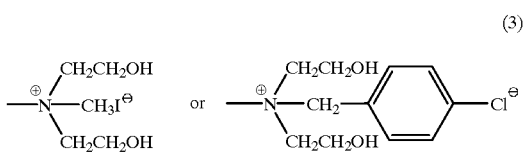

Examples of fluorine-containing betainic surfactants include compounds of the formula (2) wherein $R^5$ is a group of the formula (4).

(4)

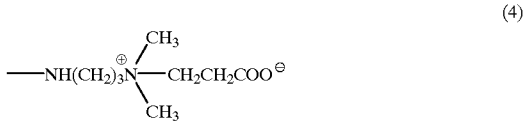

Examples of hydrocarbon-containing nonionic surfactants include polyoxyethylene alkyl ether, polyoxyethylene alkyl ester, polyoxyethylene alkylphenyl ether, sorbitan alkylate, and polyoxyethylene sorbitan monoalkylate.

Examples of hydrocarbon-containing anionic surfactants include alkylcarboxylate, alkylsulfonate, alkylsulfate, alkylbenzene sulfonate, alkylphosphonate, and alkylphosphate.

Among these surfactants, preferred are fluorine-containing surfactants, particularly fluorine-containing anionic surfactants, because they can contribute to the effect in small amounts. In the present invention the above-mentioned surfactant is added in the range of 0.01 to 10.0 wt % preferably 0.1 to 5 wt %, to the polymer in latex.

In the process of coagulating PTFE fine powder, latex obtained from polymerization is placed into, for example, a vessel equipped with an agitator and baffle boards, and a surfactant is then added in the range of 0.01 to 10.0 wt %, preferably 0.1 to 5 wt %, to the weight of the polymer in the latex. Thereafter, the latex is diluted with water so that the polymer concentration ranges 5 to 50 wt %, preferably 10 to 20 wt %, and if required, the latex pH is controlled so as be neutral or alkali. The temperature of the latex is adjusted to 0 to 80° C., and its specific gravity is adjusted to 1.03 to 1.20. The latex is then agitated more vigorously than that during the reaction. It is necessary to determine an appropriate revolutions for agitation, depending on the size of vessel, the shape of mixing blades, the structure of baffle boards, and the like. Here, the agitation may be carried out while adding, as a coagulant, water soluble organic compounds, e.g., methanol and acetone; inorganic salts, e.g., potassium nitrate and ammonium carbonate; or inorganic acids, e.g., hydrochloric acid, sulfuric acid and nitric acid. With agitation, the latex particles become unstable and then separate from the aqueous phase simultaneously with coagulation. Thereafter, washing is performed as required, to remove emulsifier, surfactant and coagulant, followed by drying.

Drying is performed by means of vacuum, high frequency, hot blast, or the like, while restraining the flow of the wet powder obtained from coagulation, preferably, while maintaining it stationary. Drying temperature ranges 10 to 250° C., preferably 100 to 180° C .The particle diameter of the powder can be controlled by the solid concentration and temperature of the latex during coagulation, and the frequency 10 of agitation. The powder is an aggregate comprising fine particles of 0.05 to 1 μm. Its mean particle diameter is the secondary one, and suitable mean particle diameters range 100 μm to 1000 μm, more preferably 300 μm to 700 μm.

The polytetrafluoroethylene fine powder of the present invention can be employed as an antidripping agent for giving antidripping properties to flammable thermoplastic resins.

The present invention also relates to flame resistive resin compositions comprising 100 parts by weight of the above-mentioned flammable thermoplastic resin, 0.01 to 5 parts by weight of the above-mentioned antidripping agent, and 0.001 to 40 parts by weight of flame retardant. Examples of flammable thermoplastic resin include polyolefin resins (polyethylene, polypropylene, polymethylpentene, etc) polyvinyl chloride, polystyrene-containing resins (polystyrene, AS, ABS, etc), polycarbonate (PC)-containing resins (PC, PC-containing alloy resins, e.g., PC/ABS, etc), polyamide-containing resins (.nylon, whole aromatic polyamides, etc) polyester-containing resins (polybutyleneterephthalate, polyethyleneterephthalate, whole aromatic polyesters, etc), acrylic-containing resins [poly(methyl methacrylate), polyacrylonitrile, etc], polyacetal, polyether ether ketone, modified polyphenylene ether, polyarylene sulfide resin, polysulfone resin, and a variety of polymer alloys.

Outstanding antidripping effects are obtained particularly when incorporated into resins, such as PC, PC alloys, polystyrene, polybutyleneterephthalate, polyethyleneterephthalate, and modified polyphenylene ether, which are used in applications requiring a higher flame resistance, e.g., housing parts and various mechanism elements for domestic electric appliances and office machinery.

In the present invention the addition of antidripping agent ranges from 0.01 to 5 parts (part by weight, same as hereinafter), preferably from 0.03 to 2 parts, per 100 parts of a flammable thermoplastic resin. Less than 0.01 part, there is a trend that a desirable antidripping properties not to be obtained. More than 5 parts, antidripping properties, mold-releasing properties and friction properties of molded articles, are improved, however, it is liable to cause poor dispersion of the antidripping agent in the resin.

Representative flame retardants are, for example, compounds containing an atom of Group 5B of the Periodic Table, such as nitrogen, phosphorus, antimony and bismuth, and compounds containing a halide of an atom of Group 7B. Examples of halide include aliphatic halides, alicyclic halides, and aromatic organic halides. There are exemplified bromine-containing halides such as tetrabromobisphenol A (TBA) decabromodiphenyl ether (DBDPE), octabromodiphenyl ether (OBDPE), TBA epoxy/phenoxy oligomer and brominated crosslinked polystyrene; chlorine-containing halides such as chlorinated paraffin and perchlorocyclopentadecane. Examples of phosphorus compound include phosphate and polyphosphates. It is preferable that antimony compounds are jointly used with halide. Examples of antimony compounds include antimony trioxide and antimony pentaoxide. Besides these, aluminum hydroxide, magnesium hydroxide and molybdenum trioxide are also usable. The flame retardant is not limited to the above, and it is possible to suitably select at least one from these flame retardants and to determine the amount thereof, depending on the type of flammable thermoplastic resins. The amount of the above-mentioned flame retardants is usually from 0.001 to 40 parts, preferably from 0.01 to 30 parts, per 100 parts of the above-mentioned resin. Less than 0.001 part, the flame resistance tends to be insufficient. More than 40 parts, it is not economical and the mechanical characteristics (impact resistance, etc) of the resin composition tends to deteriorate.

The flame resistive resin composition of the present invention comprises a flammable thermoplastic resin, the antidripping agent of the present invention, and a flame retardant. These compositions can be prepared by blending the ingredients by known methods, without limiting the conditions, e.g., the order of blending; as to whether blending is conducted in the powder or dispersion state; the type of blending machines and the combination, and the like. For example, after a flame retardant is blended with the antidripping agent of the invention, the mixture is fed into a kneader together with a flammable thermoplastic resin. Alternatively, the antidripping agent of the invention is blended with a flammable thermoplastic resin, part or all of which an aqueous dispersion or organosol. Without limiting these methods, a variety of blending methods can be employed.

To the flame resistive resin compositions of the invention, there can be added, in addition to a flame retardant and the antidripping agent, known additives, such as ultraviolet absorber, antioxidant, pigment, molding aid, calcium carbonate and glass fiber, as required.

The present invention also relates to powder compositions whose dusting characteristics is suppressed, which contains 0.005 to 1.0 part by weight of the polytetrafluoroethylene fine powder of the invention per 100 parts of powder having dusting characteristics.

As the powder having dusting characteristics, there are, for example, Portland cement compositions used in a variety of concrete structures and also used as a soil improver, quick lime used as a soil improver, slaked lime, calcium silicate used as a fertilizer, calcium carbonate and like flyashes, slug, ferrite, asphaltite, dust collection in steel furnaces, silica gel, alumina, pigment, carbon black, talc, active carbon, flame retardant, antimony oxide, and powder and granular waste, e.g., red mud and sludge.

The polytetrafluoroethylene fine powder of the invention is blended in the range of 0.005 to 1.0 part, preferably 0.01 to 0.5 part, per 100 parts of powder having dusting characteristics. Below 0.005 part, there is a tendency for a desirable dust inhibiting effect not to be obtained. Over 1.0 part, the effect is saturated and thus unfavorable from economic considerations.

Accordingly, due to. superior powder flowability of the polytetrafluoroethylene fine powder of the invention, it is possible to solve the jamming of powders in automatic weight or volumetric counting feeders. This permits a uniform dispersion of the powder, enabling the desired effect to be produced with less addition than that of conventional polytetrafluoroethylene.

Also, due to superior powder flowability of the polytetrafluoroethylene fine powder of the invention, it is possible to mix the powder uniformly with electrode materials, for example. Furthermore, since this powder does not swell with an organic electrolyte and has superior binding properties, it is possible to use the powder as binders for batteries.

BEST MODE OF CARRYING OUT THE INVENTION

Figure 1:
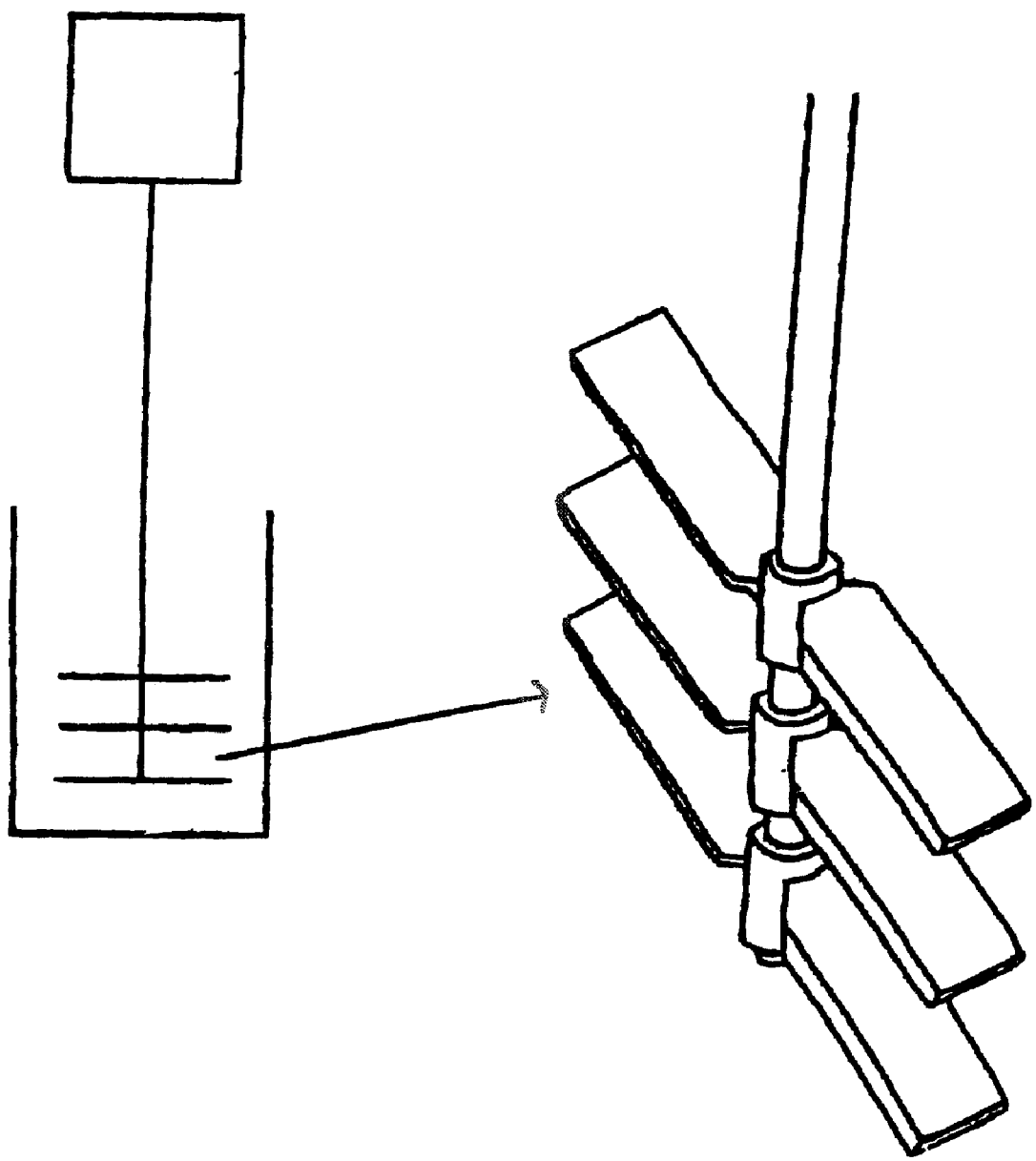
FIG. 1 is a schematic diagram of a stainless vessel equipped with mixing blades that apply shearing to powder particles.

The present invention will be further described by means of the following examples, comparative examples and test examples. Uses described herein are for showing superior powder flowability, and the uses of PTFE fine powder of the invention are not limited to these alone.

EXAMPLE 1

A 2960 ml of deionized water, 120 g of solid paraffin wax having a melting point of 62° C., and 4.4 g of ammonium perfluorooctanoate, were added into a 6-lit. capacity autoclave made of stainless steel that was equipped with the anchor type mixing blades and a jacket for adjusting temperature. While heating to 85° C., the atmosphere in the autoclave was replaced by nitrogen gas three times and tetrafluoroethylene (TFE) gas two times, to remove oxygen. Then, TFE was forced into the system until the internal pressure became 6.5 kg/cm$^2$G. At the same time, 0.26 g of chlorotrifluoroethylene (CTFE) was introduced. While agitating, an aqueous solution of 12.3 mg of ammonium persulfate (APS) in 20 ml of water, and an aqueous solution of 180 mg of disuccinic acid peroxide (DSP) in 20 ml of water, were forced into the system with TFE, so that the internal pressure of the autoclave was 8.0 kg/cm$^2$G. Although the reaction proceeded exponentially, TFE gas was continuously supplied so as to maintain the reaction temperature at 85° C. and the internal pressure of the autoclave at 8.0 kg/cm$^2$G.

When the TFE consumption during the reaction after adding an initiator reached 1300 g, 3.5 g of CTFE fluid was forced into the autoclave with TFE from a small tank. In this state, TFE was supplied to continue the reaction until the total TFE consumption reached: 1430 g, and the supply of TFE and agitation were stopped. Then, the gas in the autoclave was immediately released until it became the normal pressure, and the content was taken out, thereby terminating the reaction.

Part of the final latex was subjected to an evaporation to dryness. As the polymer concentration, the solid material was calculated to be 32.2 wt %. The mean particle diameter of latex particles was 0.24 μm, and the standard specific gravity (SSG) was 2.177. The modified amount in the polymer (CTFE content) was 0.230 wt %.

Separately, 1.15 lit. of the obtained latex and 30 g of 15 wt % aqueous solution of ammonium ω-hydroperfluorononanoate previously prepared, were placed into a 6-lit. capacity vessel for coagulation made of stainless steel equipped with the anchor type mixing blades and baffle boards. The mixture was then controlled by pouring warm water so that the specific gravity of the latex was 1.074 and the temperature of the latex was 48° C. Immediately after this control, 1.8 ml of nitric acid (60%) was added and at the same time coagulation was started at the agitation speed of 300 rpm. When the polymer was coagulated and then separated from water, the agitation was stopped, to remove the separated water. Then, 3 lit. of pure water was again added, and the polymer was agglomerated at the agitation speed of 300 rpm. After removing the water, the polymer was placed on a dried tray to left at 135° C. for 18hours, followed by drying, to obtain 435 g of fine powder. The apparent density of the obtained fine powder was 0.60 g/ml. The mean particle diameter in secondary coagulated particles was 470 μm.

TEST EXAMPLE 1

Powder Flowability Test (Measurements of Compressibility)

Using a powder tester manufactured by Hosokawa Micron Co., Ltd., the aerated apparent density (A) and the packed apparent density (P) were measured, and the compressibility was calculated from the following equation:

Compressibility=100(P−A)/P(%)

The compressibility is the most influential factor on powder flowability. Powder flowability lowers with an increase in compressibility. Thus, if powders are remained stationary for a long time in containers or hoppers, their discharge becomes difficult.

TABLE 1

| PTFE powder | aerated apparent density (g/ml) | packed apparent density (g/ml) | compressibility (%) |
|---|---|---|---|
| Ex.1 | 0.602 | 0.660 | 8.78 |
| Ex.2 | 0.593 | 0.652 | 9.05 |
| Ex.3 | 0.574 | 0.635 | 9.61 |
| Ex.4 | 0.594 | 0.652 | 8.90 |
| Com.Ex.1 | 0.452 | 0.533 | 15.20 |
| Com.Ex.2 | 0.448 | 0.541 | 17.19 |

TEST EXAMPLE 2

Thermoplastic Resin Powder Mixing Test

Figure 2:
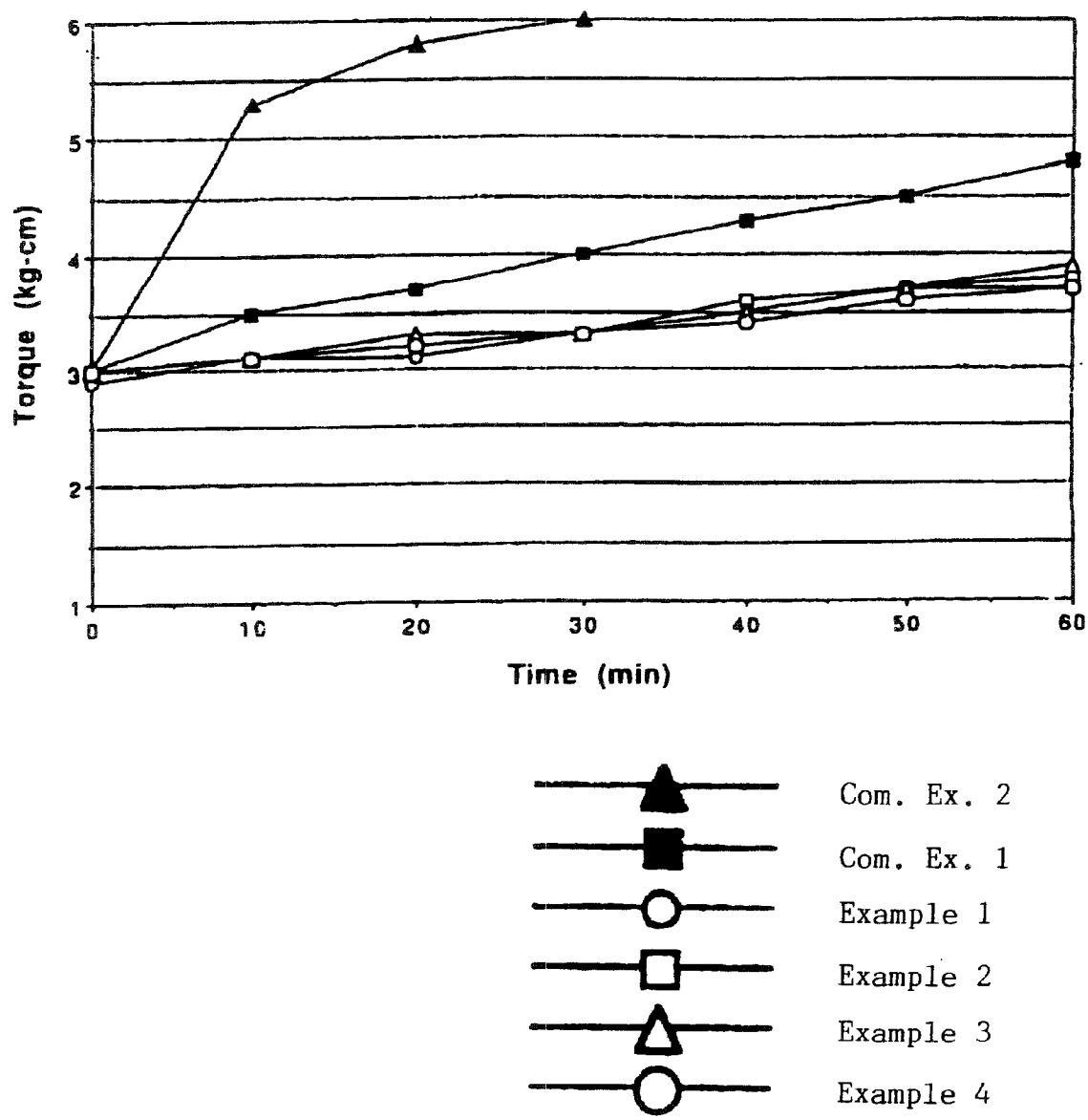
FIG. 2 is a graph showing the changes of agitation torque when powder particles are introduced into the stainless vessel of FIG. 1, and then agitated.

After 5 wt % of the fine powder obtained in Example 1 was mixed with 1.2 kg of polycarbonate powder, which was shaken sufficiently with a polyethylene bag. The mixture was then put into a stainless vessel equipped with mixing blades that exerted shearing to powder particles, as shown in FIG. 1, and agitated at the agitation speed of 60 rpm for 60 minutes. FIG. 2 shows the changes of agitation torque at that time. Table 2 shows the states of the powder briquette adhered to the mixing blades after agitation, as well as the amount of the powders which did not pass a 10-mesh sieve, with respect to all the powders after agitation.

TEST EXAMPLE 3

Antidripping Performance Test I

A 100 parts (part by weight, same as hereinafter) of polycarbonate resin (manufactured by Teijin Kasei Co., Ltd., Panlite L-1225W) as a flammable thermoplastic resin, 5.0 parts of low molecular weight oligomer of tetrabromobisphenol A (manufactured by Teijin Kasei Co., Ltd., Fireguard FG7000) as a flame retarder, and 0.5 part of the fine powder obtained in Example 1, were premixed in a tumbler at room temperature for 10 minutes. The mixture was then subjected to a compound-pelletization in a 40φ biaxial kneading and extruding machine. The kneading and extruding were conducted under an extrusion temperature of 290° C., a screw rotational frequency of 130 rpm, and a feed rate of 8 kg/hour.

Test pieces used for the fire test according to the regulations of UL 94 (5 inches in length, ½ inch in width, 1/16 inch in thickness) were prepared by using an injection molding machine (manufactured; by Sumitomo Heavy Industries Ltd., SG50). The appearance of molded articles was observed, and the fire test according to the UL 94 was conducted. The results are shown in Table 3.

Antidripping Performance Test II

A 100 parts of ABS resin (manufactured by Japan Synthetic Rubber Co., Ltd., ABS15) as a flammable thermoplastic resin, 22.5 parts of brominated epoxy resin (manufactured by Toto Kasei Co., Ltd., YDB-408) and 7.0 parts of antimony trioxide (manufactured by Nihon Seiko Co., Ltd., ATOX-S) as flame retardants, and 0.39 part of the fine powder obtained in Example 1, were premixed in a tumbler at room temperature for 10 minutes. The mixture was then subjected to compound-pelletization in a 40φ biaxial kneading and extruding machine. The kneading and extruding were conducted under an extrusion temperature of 210° C., a screw rotational frequency of 130 rpm, and a feed rate of 8 kg/hour.

Test pieces used for the fire test according to the UL 94 were prepared in the same manner as stated. The appearance of molded articles was observed, and the fire test according to the UL 94 was conducted. The results are shown in Table 3.

EXAMPLE 2

Fine powder was obtained in the same manner as in Example 1 except that ammonium perfluorooctanoate was used in place of ammonium ω-hydroperfluorononanoate, as a surfactant to be added in coagulation. The apparent density of the obtained fine powder was 0.59 g/ml, and the mean particle diameter of secondary coagulated particles was 475 μm.

EXAMPLE 3

Fine powder was obtained in the same manner as in Example 1 except that the amount of 15 wt % aqueous solution of ammonium ω-hydroperfluorononanoate was changed to 15 g. The apparent density of the obtained fine powder was 0.57 g/ml, and the mean particle diameter of secondary coagulated particles was 490 μm.

EXAMPLE 4

A 2960 ml of deionized water, 100 g of solid paraffin wax having a melting point of 56° C., and 3.0 g of ammonium perfluorooctanate, were placed into an autoclave similar to that in Example 1. While heating to 70° C., the atmosphere in the autoclave was replaced by nitrogen gas three times and TFE gas two times, to remove oxygen. Then, TFE was forced into the system so that the internal pressure became 7.0 kg/cm²G. Next, 0.3 g of perfluoropropyl vinyl ether (PPVE), an aqueous solution of 11.25 mg of ammonium persulfate (APS) in 20 ml of water, and an aqueous solution of 360 mg of disuccinic acid peroxide (DSP) in 20 ml of water, were forced into the system with TFE so that the internal pressure of the autoclave was 8.0 kg/cm²G. Although the reaction proceeded exponentially, it was controlled to maintain a reaction temperature of 70° C. and an agitation frequency of 280 rpm. TFE was continuously supplied. so that the internal pressure of the autoclave was always maintained at 8.0 kg/cm²G.

When the TFE consumption during the reaction after adding an initiator reached 1300 g, the supply of TFE and agitation were stopped. The gas in the autoclave was immediately released until the internal pressure became 2 kg/cm²G. Then, after switching to a line of a previously prepared mixed monomers of CTFE and TFE, containing 1.5 mol % CTFE, gases were continuously supplied to the autoclave in the same manner as stated above. That is, the reaction was continued while maintaining an internal pressure of 8.0 kg/cm²G and an agitation frequency of 280 rpm with the mixed monomers.

When the mixed monomers consumption reached 130 g, the supply of the mixed monomers and agitation were stopped. The gas in the autoclave was immediately released until the internal pressure became the normal pressure, and the content was taken out, thereby terminating the reaction.

Part of the final latex was subjected to an evaporation to dryness. As the polymer concentration, the solid material was calculated to be 32.2 wt %. From this value, the entire polymer yield was nearly equal to the monomer consumption, although including a slight difference.

The mean particle diameter of the latex particles was 0.20 μm. Measurements for the PPVE content and CTFE content in the polymer gave 0.02 wt % and 0.090 wt %, respectively. The SSG of the polymer was 2.176.

As to the chlorotrifluoroethylene content of the polymer, a value obtained by multiplying the ratio of the absorbance of 957 cm$^{-1}$ to that of 2360 cm$^{-1}$ in the infrared absorption spectrum band by 0.58, was defined as wt % in the polymer. As to the perfluoro(propyl vinyl ether) content in the polymer, a value obtained by multiplying the ratio of the absorbance of 995 cm$^{-1}$ to that of 2360 cm$^{-1}$ in the infrared absorption spectrum band by 0.95, was defined as wt % in the polymer.

The following procedure was carried out in the same manner as in Example 1, to obtain fine powder. The apparent density of the fine powder was 0.59 g/ml. The mean particle diameter of secondary coagulated particles was 480 μm.

COMPARATIVE EXAMPLE 1

A 1.15 lit. of the latex obtained in Example 1 was placed into a vessel for coagulation similar to that in Example 1. The mixture was then controlled by pouring warm water so that the specific gravity of the latex was 1.080 and the temperature of the latex was 35° C. Immediately after this control, coagulation was started at the agitation speed of 300 rpm, to obtain fine powder in the same manner as in Example 1. The apparent density of the fine powder was 0.45 g/ml. The mean particle diameter of secondary coagulated particles was 500 μm.

COMPARATIVE EXAMPLE 2

A 2960 ml of deionized water, 86 g of paraffin wax, and 4.4 g of ammonium perfluorooctanate, were placed into an autoclave similar to that in Example 1. While heating to 85° C., the atmosphere in the autoclave was replaced by nitrogen gas three times and TFE gas two times, to remove oxygen. Then, TFE was forced into the system until the internal pressure became 6.5 kg/cm²G. Next, an aqueous solution of 18.8 mg of ammonium persulfate (APS) in 20 ml of water, and an aqueous solution of 300 mg of disuccinic acid peroxide (DSP) in 20 ml of water, were forced into the system with TFE, so that the internal pressure of the autoclave was 8.0 kg/cm²G.

When the TFE consumption during the reaction after adding an initiator reached 1430 g, the supply of TFE and agitation were stopped. The gas in the autoclave was immediately released until it became the normal pressure, and the content was taken out. The following procedure was conducted in the same manner as in Comparative Example 1 except that the coagulation temperature of the obtained latex was 19° C., thereby obtaining fine powder. The mean particle diameter of the latex particles was 0.30 μm, and the specific gravity of the polymer was 2.173. The apparent density of the fine powder was 0.45 g/ml. The mean particle diameter of secondary coagulated particles was 500 μm.

The fine powders obtained in Examples 2 to 4 and Comparative Examples 1 to 2, were subjected to powder flowability test, thermoplastic resin powder mixing test and antidripping performance tests, in the same manner as in Test Examples 1 to 3. The results are shown in Tables 2 and 3.

TABLE 2

| PTFE powder | (1) adherance to mixing blade | amount of powder which does not pass 10-mesh sieve |
| --- | --- | --- |
| Ex.1 | ○ | 23 g |
| Ex.2 | ○ | 26 g |
| Ex.3 | ○ | 32 g |
| Ex.4 | ○ | 18 g |
| Com.Ex.1 | Δ | 83 g |
| Com.Ex.2 | X | 180 g |

Remarks (1): Symbols used in Table 2 have the following means:

"X" denotes that polycarbonate powder and PTFE powder, part of which has been fibrilized, adhere markedly to the mixing blades;

"Δ" denotes that polycarbonate powder and PTFE powder, part of which has been fibrilized, adhere slightly to the mixing blades; and "○" denotes that hardly or no polycarbonate powder and PTFE powder, part of which has been fibrilized, adhere to the mixing blades.

TABLE 3

| | | polycarbonate resin | | |
| --- | --- | --- | --- | --- |
| PTFE powder | (2) appearance of molded article | UL 94 | n = 10 number of drips | n = 5 burning time |
| Ex.1 | ○ | V-0 | 0/10 | 7 |
| Ex.2 | ○ | V-0 | 0/10 | 9 |
| Ex.3 | ○ | V-0 | 0/10 | 28 |
| Ex.4 | ○ | V-0 | 0/10 | 31 |
| Com.Ex.1 | Δ | V-0 | 0/10 | 45 |
| Com.Ex.2 | X | V-0 | 0/10 | 30 |

| | ABS resin | | |
| --- | --- | --- | --- |
| PTFE powder | UL 94 | n = 10 number of drips | n = 5 burning time |
| Ex.1 | V-0 | 0/10 | 3 |
| Ex.2 | V-0 | 0/10 | 3 |
| Ex.3 | V-0 | 0/10 | 4 |
| Ex.4 | V-0 | 0/10 | 4 |

TABLE 3-continued

| Com.Ex.1 | V-0 | 0/10 | 5 |
| --- | --- | --- | --- |
| Com.Ex.2 | V-0 | 0/10 | 4 |

Remarks (2): Symbols used in Table 3 have the following means:

"X" denotes that PTFE particles within the molded article are dispersed sparsely; (from several ten to several hundred μm), and silver lines due to the segregation of PTFE occur markedly from the molded article gate;

"Δ" denotes that silver lines occur somewhat; and

"○" denotes that PTFE particles within the molded article are dispersed finely (from several to several ten μm), and no silver lines occur from the gate.

Method of Measuring Apparent Density

Figure 3:
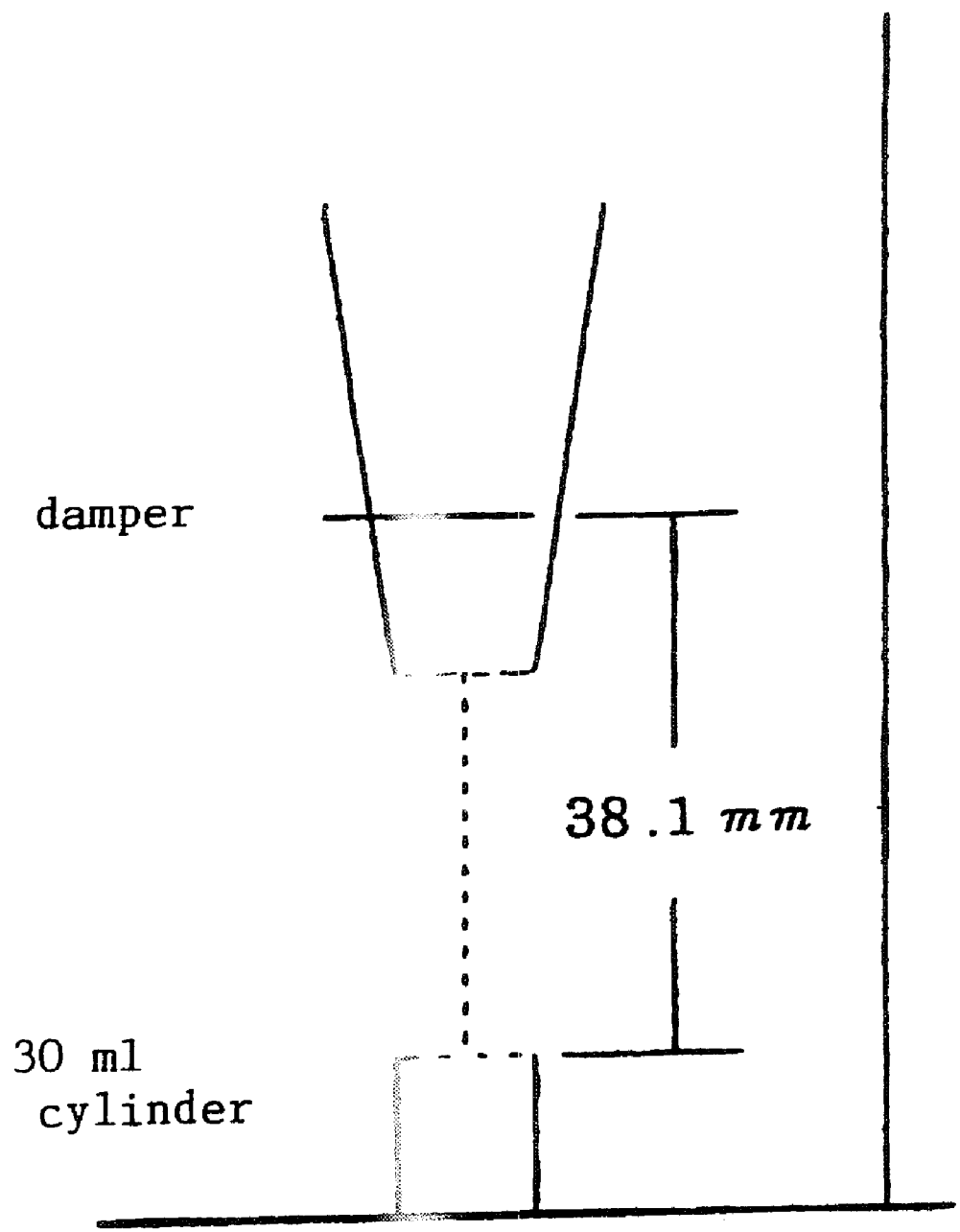
FIG. 3 is a schematic diagram of a device used for measuring apparent densities.

A hopper and a 35-ml cylinder were set as shown in FIG. 3. The cylinder was heaped up with fine powders that had been previously sieved by a 10-mesh sieve, and the fine powders above the top surface were quickly cut by rubbing with a glass bar. A specimen in the 35-ml cylinder was put into the hopper, and a pass partition was removed to shift the specimen to a 30-ml cylinder. Its top surface was cut by rubbing with a glass bar, followed by weighing.

Apparent Density (g/ml)=[(Weight of Specimen+Weight of Cylinder Tare)−Weight of Cylinder Tare]/30 ml.

Mean Particle Diameter of Secondary Coagulated Particles

On a sieve having 20-, 32-, 48-, 60-, and 80-mesh, a lid and a tray, 50 g of specimen was accurately weighed and then placed on the 20-mesh to sieve with ro-tap for 10 minutes. Thereafter, the amount of powders which had not passed the respective sieves and that of powders which had passed the 80 mesh, were weighed to calculate their wt %. The particle diameter of 50 wt % was employed as the mean particle diameter. The polymer concentration, the mean particle diameter of the primary particles, and the standard specific gravity (SSG), were measured by the method disclosed in JP-B-3765/1992.

EXAMPLE 5

A 100 kg of a commercial available quick lime was placed into a 500-lit. capacity Henschel mixer. By using an automatic weight or volumetric counting feeder, 30 g (0.03 wt %) of PTFE (0.60 g/ml in apparent density, and 2.177 in specific gravity) of Example 1, was added to the quick lime, followed by mixing with agitation. This procedure was repeated ten times. After inspecting the interior of the feeder, no jamming of the PTFE powders were observed. In addition, the mixed quick lime powders were satisfactorily suppressed from having dusting characteristics.

Separately, the same procedure as described was carried out ten times by using a conventional polytetrafluoroethylene (the PTFE of Comparative Example 2, having an apparent density of 0.45 g/ml and a specific gravity of 2.173). After inspecting the interior of the feeder, the jamming of the PTFE powders were observed. To suppress the dirt and dust of the quick lime, 0.1 wt % of the PTFE fine powder was required.

INDUSTRIAL APPLICABILITY

According to the present invention, it is possible to obtain PTFE fine powders having superior powder flowability, handling characteristics and dispersibility; antidripping agents using the PTFE fine powder; flame resistive resin compositions containing the PTFE fine powder; and compositions for inhibiting dusting characteristics containing the polytetrafluoroethylene fine powder.

What is claimed is:

1. A polytetrafluoroethylene fine powder excellent in powder flowability which comprises fine primary particles having a mean particle diameter of 0.05 to 1 μm, an apparent density of 0.52 to 0.70 g/ml, a standard specific gravity (SSG) of 2.1:4 to 2.23, and a secondary mean particle diameter of 100 to 1000 μm.

2. A polytetrafluoroethylene fine powder as defined in claim 1 wherein the polytetrafluoroethylene is a modified polytetrafluoroethylene.

3. A polytetrafluoroethylene fine powder as defined in claim 1 wherein the apparent density is 0.56 to 0.70 g/ml.

4. A process for preparing a polytetrafluoroethylene fine powder of claim 1 comprising subjecting to coagulation, with addition of a surfactant, a polytetrafluoroethylene latex obtained by emulsion polymerization of tetrafluoroethylene.

5. A process for preparing a modified polytetrafluoroethylene fine powder of claim 2 comprising subjecting to coagulation, with addition of a surfactant modified polytetrafluoroethylene latex obtained by emulsion polymerization of tetrafluoroethylene and other fluorine-containing monomer.

6. A process as defined in claim 4 wherein the surfactant is fluorine-containing anionic surfactant, fluorine-containing nonionic surfactant, fluorine-containing cationic surfactant, fluorine-containing betainic surfactant, hydrocarbon-containing nonionic surfactant or hydrocarbon-containing anionic surfactant.

7. A process as defined in claim 4 wherein the surfactant is added in the range of 0.01 to 10.0 wt % to the polymer in latex.

8. A polytetrafluoroethylene fine powder of claim 1 which is obtained by subjecting to coagulation, with addition of a surfactant, a polytetrafluoroethylene latex obtained by emulsion polymerization.

9. An antidripping agent for giving antidripping properties to flammable thermoplastic resins which comprises a polytetrafluoroethylene fine powder of claim 1.

10. A flame resistive resin composition comprising 100 parts by weight of a flammable thermoplastic resin, 0.01 to 5 parts by weight of the antidripping agent of claim 9, and 0.001 to 40 parts by weight of a flame retardant.

11. A powder composition whose dusting characteristics is suppressed comprising 100 parts by weight of powder having dusting characteristics and 0.005 to 1.0 part by weight of a polytetrafluoroethylene fine powder of claim 1.

12. A polytetrafluoroethylene fine powder excellent in powder flowability which comprises fine primary particles obtained by subjecting to coagulation, with addition of a surfactant, a polytetrafluoroethylene latex obtained by emulsion polymerization, said particles having a mean particle diameter of 0.05 to 1 μm, an apparent density of 0.52 to 0.70 g/ml, a standard specific gravity of 2.14 to 2.23, and a secondary mean particle diameter of 100 to 1000 μm.

13. A polytetrafluoroethylene fine powder as defined in claim 1, wherein said apparent density is aerated apparent density.

14. The polytetrafluoroethylene fine powder of claim 1, wherein said polytetrafluoroethylene fine powder is a resin additive.

15. The polytetrafluoroethylene fine powder of claim 1, wherein said polytetrafluoroethylene fine powder is a binder for batteries.

* * * * *